United States Patent
Zhang et al.

(10) Patent No.: US 9,136,882 B2
(45) Date of Patent: Sep. 15, 2015

(54) UPLINK CHANNEL ESTIMATION FOR A SOFTWARE DEFINED RADIO

(75) Inventors: Senjie Zhang, Beijing (CN); Xuebin Yang, Beijing (CN); Guangjie Li, Beijing (CN); Peng Cheng, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/825,800

(22) PCT Filed: Sep. 24, 2010

(86) PCT No.: PCT/CN2010/001469
§ 371 (c)(1),
(2), (4) Date: Jun. 11, 2013

(87) PCT Pub. No.: WO2012/037705
PCT Pub. Date: Mar. 29, 2012

(65) Prior Publication Data
US 2014/0169341 A1    Jun. 19, 2014

(51) Int. Cl.
*H04J 3/00* (2006.01)
*H04B 1/00* (2006.01)
*H04L 25/02* (2006.01)

(52) U.S. Cl.
CPC ............ *H04B 1/0003* (2013.01); *H04L 25/022* (2013.01); *H04L 25/0204* (2013.01); *H04L 25/0212* (2013.01); *H04L 25/0232* (2013.01); *H04L 25/0242* (2013.01)

(58) Field of Classification Search
None
See application file for complete search history.

(56) References Cited

U.S. PATENT DOCUMENTS

| 8,218,690 | B1* | 7/2012 | Zhang | 375/340 |
| 2007/0211827 | A1* | 9/2007 | Baggen et al. | 375/316 |
| 2008/0043708 | A1 | 2/2008 | Muharemovic et al. | |
| 2009/0131123 | A1* | 5/2009 | Coersmeier et al. | 455/574 |
| 2009/0268695 | A1* | 10/2009 | Zhao et al. | 370/336 |
| 2010/0040154 | A1* | 2/2010 | Carbonelli et al. | 375/260 |
| 2011/0243103 | A1* | 10/2011 | Kowalski et al. | 370/336 |

(Continued)

FOREIGN PATENT DOCUMENTS

| CN | 1791077 A | 6/2006 |
| CN | 101202721 A | 6/2008 |

(Continued)

OTHER PUBLICATIONS

International Search Report and Written Opinion received for International Application No. PCT/CN2010/001469, mailed Jun. 9, 2011, 9 pages.

*Primary Examiner* — Curtis A Alia
*Assistant Examiner* — Rebecca Song
(74) *Attorney, Agent, or Firm* — Thorpe North & Western LLP

(57) ABSTRACT

A system and method for uplink channel estimation for a software defined radio is disclosed. The method comprises dividing an allocated bandwidth for a received signal on the uplink channel into N segments. The uplink channel estimation is processed for each of the N segments as a separate process. The uplink channel estimation includes pre-processing each of the N segments of the received signal; Wiener filtering the pre-processed segments of the received signal in the frequency domain; and Wiener filtering each of the frequency filtered segments in the time domain to determine a channel estimate for each of the N segments for use in equalizing the received signal.

21 Claims, 8 Drawing Sheets

(56) References Cited

U.S. PATENT DOCUMENTS

2012/0063294 A1* 3/2012 Osterling et al. ............ 370/210
2013/0215826 A1* 8/2013 Kalyani et al. .............. 370/328
2014/0146858 A1* 5/2014 Luschi et al. ................ 375/148

FOREIGN PATENT DOCUMENTS

| CN | 101702696 A | 5/2010 |
| WO | 2012/037705 A1 | 3/2012 |

\* cited by examiner

UPLINK CHANNEL ESTIMATION FOR A SOFTWARE DEFINED RADIO

RELATED APPLICATIONS

This application is a United States national stage application claiming priority to PCT patent application serial no. PCT/CN2010/001469, filed on 24 Sep. 2010, which is herein incorporated by reference in its entirety.

BACKGROUND

When information is transmitted over a wireless channel then the received signal can be distorted due to the effects of multipath transmissions. Multipath transmissions can be caused by reflections of the transmitted signal off of objects such as buildings, vehicles, and other types of obstructions. The result is that multiple copies of the transmitted signal arrive at the receiver, with each signal having a certain time delay. The amount of the time delay is proportional to the length of the path the signal traveled. Obviously, signals that are reflected multiple times will travel a longer path than a signal with a direct line of sight.

The amount of time between a first signal (typically the line of sight signal) and a last reflected signal arrive at the receiver is referred to as the delay spread. In cellular communication applications delay spreads can be on the order of several microseconds. The delay induced by multipath can cause a symbol received along a delayed path to "bleed" into a subsequent symbol arriving at the receiver via a more direct path. This is typically referred to as inter-symbol interference (ISI). In a single carrier communication system, the symbol times decrease as the data rates increase. At very high data rates (with correspondingly shorter symbol periods) it is possible for ISI to exceed an entire symbol period and spill into a second or third subsequent symbol. This can cause significant problems at the receiver.

In addition to problems in the time domain, there can be additional problems in the frequency domain due to multipath distortion. As the multiple reflected signals are combined at the receiver, some frequencies within the signal passband can undergo constructive interference (a linear summation of in-phase signals), while other signals may undergo destructive interference (a linear summation of out-of-phase signals). This can result in a composite received signal that is distorted by frequency selective fading.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
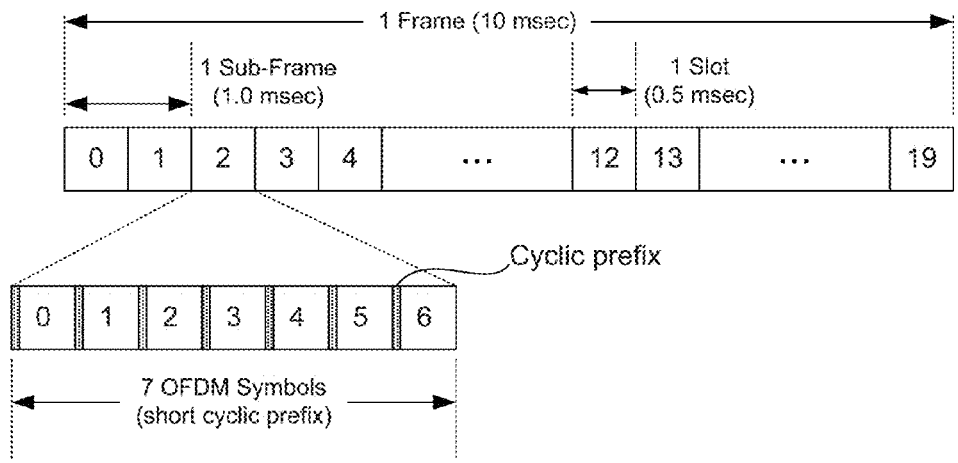
FIG. 1 provides an example illustration of an LTE frame structure.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Single carrier systems compensate for channel distortion via time domain equalization. Generally, time domain equalizers compensate for multipath induced distortion by one of two methods:

1. Channel inversion: A known sequence is transmitted over the channel prior to sending information. Because the original signal is known at the receiver, a channel equalizer is able to determine the channel response and multiply the subsequent data-bearing signal by the inverse of the channel response to substantially reverse the effects of the multipath.
2. CDMA systems can employ rake equalizers to resolve the individual paths and then combine digital copies of the received signal shifted in time to enhance the received signal-to-noise ratio (SNR).

In either case, channel equalization implementation becomes increasingly complex as data rates increase. Symbol times become shorter and receiver sample clocks are selected that are proportionally faster. This leads to more severe inter-symbol interference that may span several symbol periods.

Data sent on single carrier signals can only be increased by increasing the data rate. In order to reduce inter-symbol interference while allowing an increase in data rates, the data can be sent on multiple parallel paths. For instance, in Orthogonal Frequency Division Modulation (OFDM), the communication systems do not rely on increased symbol rates in order to achieve higher data rates. Rather, OFDM systems break the available bandwidth into many sub-carriers having a narrower frequency bandwidth and transmit the data in parallel streams. Each OFDM symbol is a linear combination of the instantaneous signals of each of the sub-carriers in the channel. Because data is transmitted in parallel rather than serially, OFDM symbols are typically substantially longer than symbols on a single carrier system of equivalent data rate.

Each OFDM symbol is typically preceded by a cyclic prefix (CP). The length of the CP is selected so that preceding symbols do not spill over into the data portion of the signal, which is also referred to as the fast Fourier transform (FFT) period. Thus, the CP can be used to effectively eliminate ISI.

However, since the OFDM symbol is a linear combination of the instantaneous signals in the sub-carriers, the signal can have a large peak-to-average power ratio (PAPR). This can reduce the efficiency of the transmitter radio frequency power amplifier (RFPA) and create a need for analog to digital and digital to analog converters with a high dynamic range.

Sub-carriers in OFDM signals can be very tightly spaced to make efficient use of available bandwidth. The close spacing of sub-carriers is possible due to the orthogonality of the sub-carriers. An OFDM system can achieve zero inter-carrier interference (ICI) if each subcarrier is sampled precisely at its center frequency. However, the transmitter and receiver local oscillators used to perform down conversion of the radio frequency carrier signal will invariably drift, so active means are used to keep them synchronized. Each base station periodically sends synchronization signals which are used by User Equipment (UE) (i.e. the user's cell phone or mobile computing device) to stay in sync with the base station clock. Even so, other sources such as Doppler shifts and oscillator phase noise can still result in frequency errors. Uncorrected frequency errors can result in ICI. The signal frequency can be tracked continuously to correct offsets in the baseband processor to avoid excessive ICI that may result in dropped packets.

3GPP LONG TERM EVOLUTION

The $3^{rd}$ Generation Partnership Project (3GPP) Long Term Evolution (LTE) advanced mobile communication standard was submitted as a candidate $4^{th}$ generation (4G) system to the Telecommunication Standardization Sector (ITU-T) in the Fall of 2009 and is expected to be adopted in 2011. The proposed standard uses OFDM Multiple Access (OFDMA) in the physical layer generic frame structure. FIG. 1 provides an example illustration of an LTE frame structure. LTE frames are 10 milliseconds (msec) in duration. Each frame is divided into 10 subframes, with each subframe being 1.0 msec long. Each subframe is further divided into two slots that are each 0.5 msec in duration. Slots can include of either 6 or 7 OFDM symbols and cyclic prefixes, depending on whether the normal or extended cyclic prefix is employed.

Figure 2:
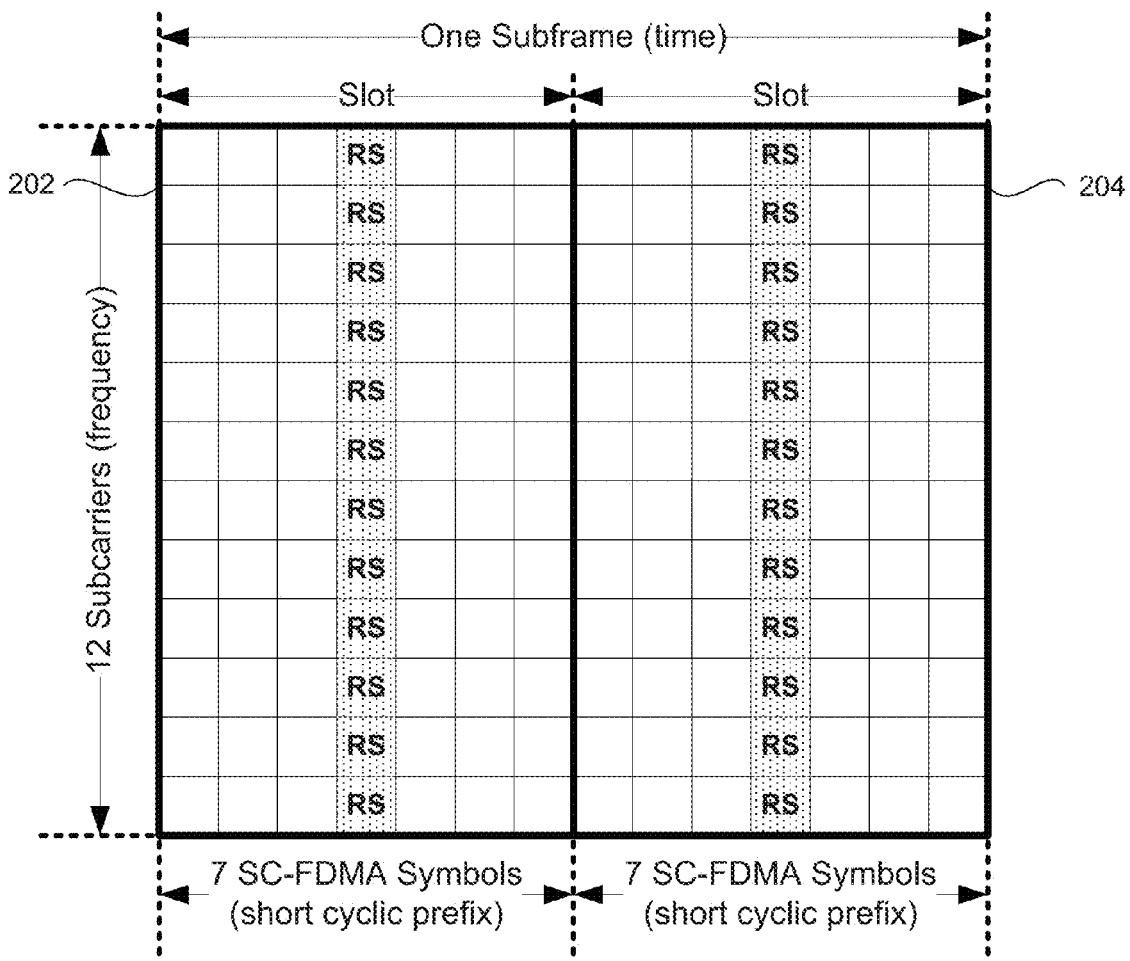
FIG. 2 provides a block diagram of an example subframe that is comprised of two slots.

In OFDMA, users are allocated a specific number of subcarriers for a predetermined amount of time. The minimum number of subcarriers over a minimum amount of time in the LTE standard is referred to as a physical resource block (PRB), which represents the smallest subdivision. Each PRB is defined in the LTE standard as comprising 12 consecutive subcarriers for one slot (either 6 or 7 OFDM symbols in 0.5 msec) of duration. FIG. 2 shows an example subframe that is comprised of two slots, providing a first PRB 202 and a second PRB 204.

Rather than using a preamble to facilitate a carrier offset estimate, channel estimation, timing synchronization, and so forth, LTE uses special reference signals that are embedded in the PRBs, as shown in FIG. 2 by the designation of "RS". In the uplink, the reference signals may be transmitted during the 4th symbol of each slot when the short CP is used. The channel response of subcarriers bearing the reference symbols can be computed directly. Interpolation can be used to estimate the channel response on the remaining subcarriers.

SC-FDMA

Limiting power consumption for wireless connections with user equipment (UE) such as cell phones or mobile computing devices enables the devices to operate longer on a single battery charge. As previously discussed, the use of OFDM causes a relatively large peak-to-average power ratio (PAPR). This can reduce the efficiency of the transmitter radio frequency power amplifier (RFPA) and create a need for analog to digital and digital to analog converters with a high dynamic range, thereby reducing efficiency.

In order to increase the efficiency by reducing the PAPR, the LTE standard suggests the use of Single-Carrier Frequency Division Multiple Access (SC-FDMA) for uplink communication from the UE to the base station. The basic transmitter and receiver architecture is very similar to OFDMA, and it offers the same degree of multipath protection, while reducing the PAPR since the underlying waveform is essentially single-carrier.

However, the term "single-carrier" is somewhat of a misnomer, as SC-FDMA transmissions can be thought of as linear summations of discrete subcarriers. The LTE frame structure for an SC-FDMA downlink is the same as the structure illustrated in FIG. 2, though different reference signals may be used. The reference signals in each uplink PRB may also be communicated at different locations in the PRB than is illustrated in FIG. 2. These details are disclosed in the 3GPP LTE standard.

Figure 3:
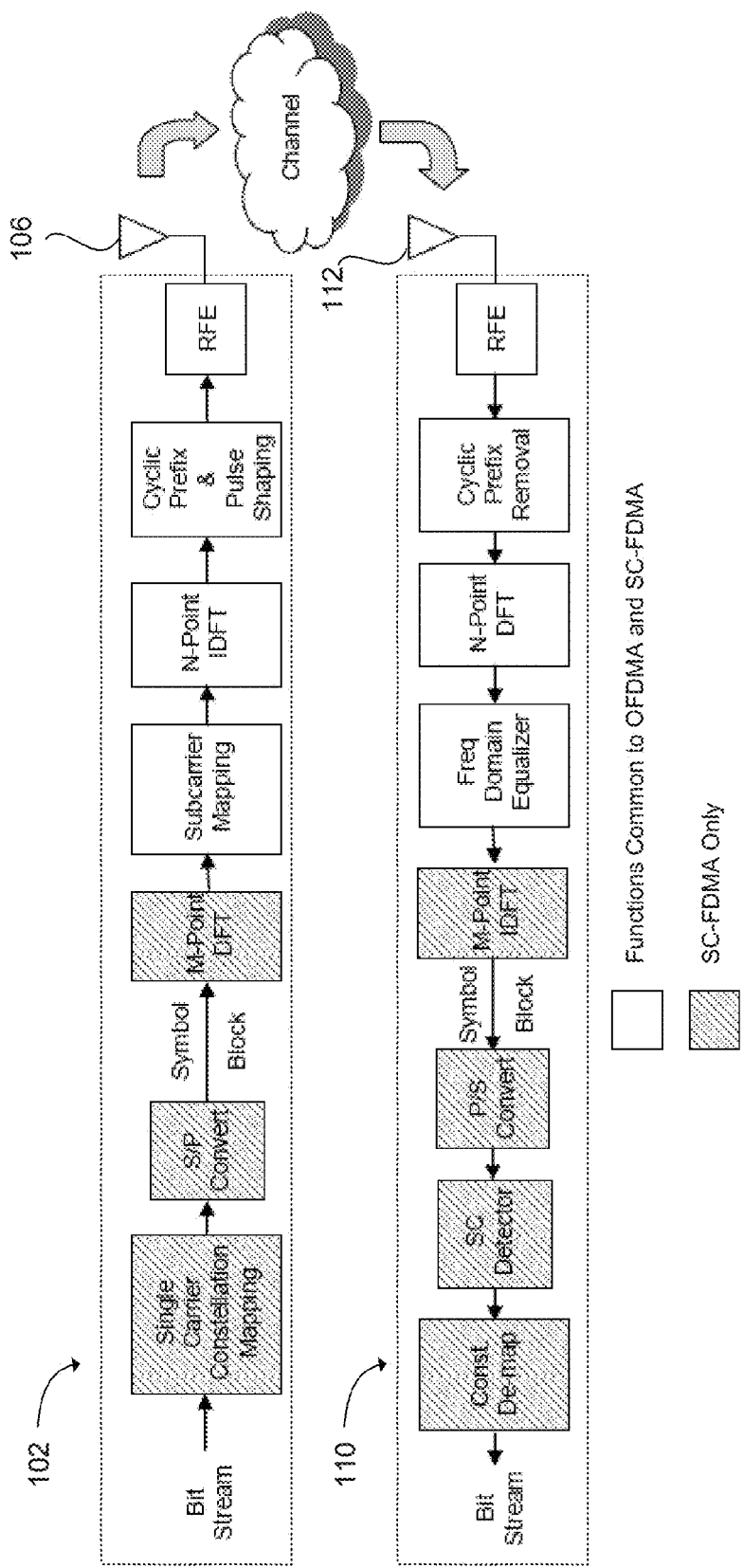
FIG. 3 illustrates a block diagram of an example SC-FDMA transmitter/receiver.

FIG. 3 illustrates a block diagram of an example SC-FDMA transmitter/receiver. Many of the functional blocks are common to both the SC-FDMA used by the uplink and the OFDMA used by the downlink. The functional blocks in the transmit side chain 102 include:

3. Constellation mapper: Converts incoming bit stream to single carrier symbols (BPSK, QPSK, or 16 QAM depending on channel conditions);
4. Serial/parallel converter: Formats the time domain single carrier symbols into blocks for input to the fast Fourier transform engine;
5. M-point DFT: Converts each time domain single carrier symbol block into M discrete tones using discrete Fourier transform;

6. Subcarrier mapping: Maps discrete Fourier transform output tones to specified subcarriers for transmission. SC-FDMA systems can either use contiguous tones (localized) or uniformly spaced tones (distributed);
7. N-point IDFT: Converts mapped subcarriers back into time domain (using inverse discrete Fourier transform) for transmission;
8. Cyclic prefix and pulse shaping: Cyclic prefix is prepended to the composite SC-FDMA symbol to provide multipath immunity in the same manner as described for OFDM; pulse shaping is employed to prevent spectral regrowth; and
9. RFE: Converts the digital signal to analog and upconverts the signal for radio frequency transmission;

One or more antennas 106 can be used to transmit the radio frequency signal. Any type of antenna may be used including, for example, dipoles, patch antennas, helical antennas, and so forth.

In the receive side chain 110, the process is effectively reversed. Multipath distortion for an SC-FDMA signal can be handled with the removal of the cyclic prefix, conversion of the signal to frequency domain, and a channel correction applied on a subcarrier-by-subcarrier basis. While the SC-FDMA signal that is represented by the discrete subcarriers is actually single carrier. Unlike an OFDM signal, SC-FDMA subcarriers are not independently modulated. As a result, PAPR is lower than for OFDM transmissions.

MIMO

The use of multiple transmit antennas and multiple receive antennas, commonly referred to as Multiple Input Multiple Output (MIMO), can provide significant increases in data throughput and link range without additional bandwidth or transmit power. MIMO achieves the increase in data throughput and range by enabling higher spectral efficiency (more bits per second per hertz of bandwidth) and an improvement in link reliability and/or diversity (reduced fading).

The number of antennas used in a MIMO system can vary. The number of transmitter antennas may be the same as the number of receive antennas, such as a 2×2 or 3×3 array. Alternatively, more antennas may be located on one side, such as a 2×3 or 2×4 array. Typically, a UE is limited in the number of antennas that can be located on the device. This is due to spatial separation requirements that are needed to provide adequate spatial diversity for the antennas. A base station, however, can typically incorporate a desired number of antennas with a sufficient separation.

Figure 4:
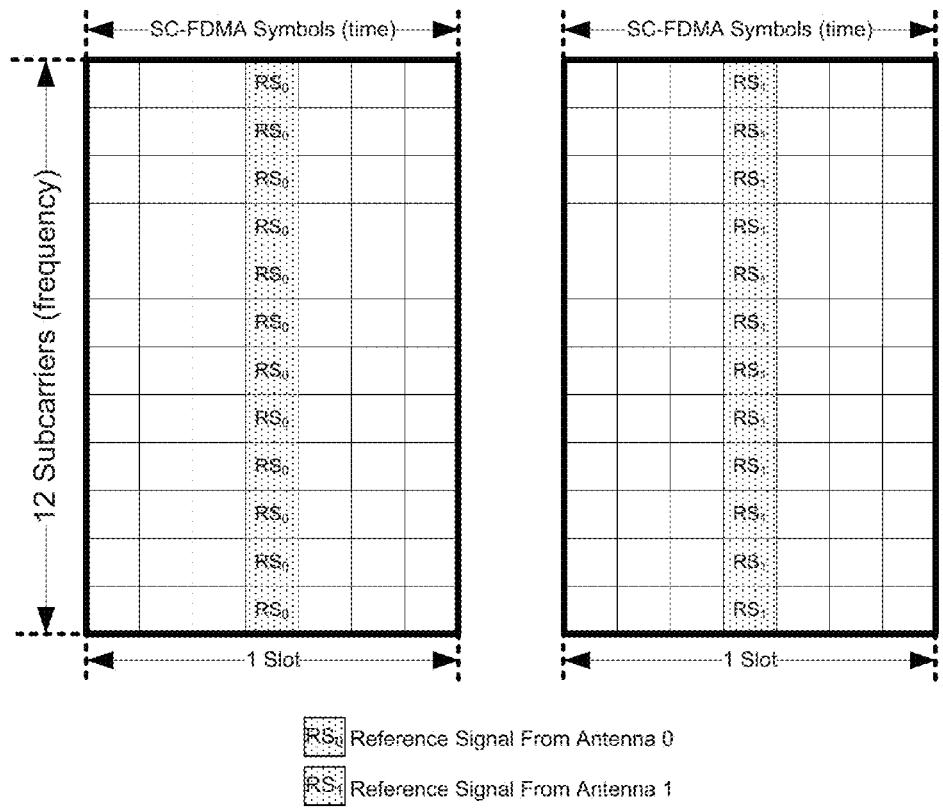
FIG. 4 provides a block diagram of example subframes received from two separate transmit antennas.

In order to successfully receive a MIMO transmission, a receiver can determine the channel impulse response from each transmitting antenna. In LTE, the channel impulse response for each channel is determined by sequentially transmitting known reference signals from each transmitting antenna, as shown in FIG. 4. Once a channel impulse response has been determined for each channel then the channels can be used to communicate simultaneously. In a 2×2 MIMO system, there are a total of four channel impulse responses corresponding to the four separate channels that can be formed between the antennas.

Many types of user equipment, such as cell phones and other types of handheld computing devices do not have a sufficient size to incorporate multiple antennas with adequate spacing between the antennas. The advantages of MIMO can still be obtained through partnering with the antennas of other devices. The coordination of transmission and reception using the single or multiple antenna(s) of two or more separate devices to one or more devices having at least two antennas is commonly referred to as virtual MIMO.

For instance, two devices having a single antenna can be configured to coordinate transmission to two additional devices that each has a single antenna. Typically, a virtual MIMO system is comprised of two or more devices having at least one antenna that coordinate transmission to a base station with at least two antennas. One challenge for communicating with virtual MIMO is that a high level of precision in channel estimation is typically used to enable virtual MIMO.

In accordance with one embodiment of the present invention, a system and method for uplink channel estimation is disclosed. The system and method enable the channel estimation to be performed with a high level of precision that enables the estimation to be used to support a high modulation order and/or a system using virtual-MIMO. The system and method allow the calculation of the channel estimation to be performed with a linear increase in complexity relative to bandwidth.

The linear increase enables the system and method to be incorporated in a software defined radio (SDR). An SDR is a radio communication system in which components that have been typically implemented in hardware (e.g. mixers, filters, amplifiers, modulators/demodulators, detectors, etc.) are instead implemented by means of software on a personal computer or embedded computing devices. The system and methods disclosed are especially well suited for use in an SDR with one or more processors that are capable of parallel processing using, for example, multiple threads and/or multiple processor cores.

Figure 5:
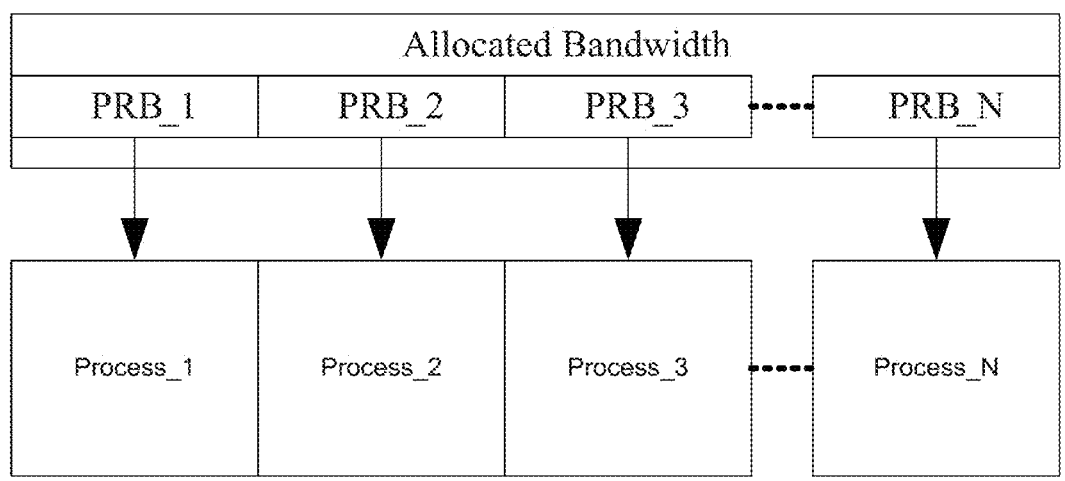
FIG. 5 illustrates a block diagram showing the allocated bandwidth that is divided into a number of PRBs in accordance with an embodiment of the present invention.

In the LTE standard, an allocated bandwidth consists of N physical resource blocks (PRB). The allocated bandwidth of an uplink signal can be divided into N PRBs. This allows the received signal for each PRB to be processed in parallel. For instance, FIG. 5 illustrates a block diagram showing the allocated bandwidth that is divided into a number of PRBs. The channel estimation for each PRB can be determined using a separate process. The amount of bandwidth per PRB is based on the LTE standard. The LTE standard designates that each sub-carrier has a bandwidth of 15 kilohertz (KHz). A PRB is comprised of 12 subcarriers, for a total bandwidth of 180 KHz for the PRB. Other types of wireless specifications may allocate resources differently, and therefore the allocated bandwidth may be divided differently.

In one embodiment, a separate uplink channel estimation is performed for each PRB for each separate uplink channel. Each PRB channel response estimation may be processed in parallel using, for example, a separate processor or a processor configured for parallel processing using multiple threads or multiple cores, as previously discussed.

Figure 6:
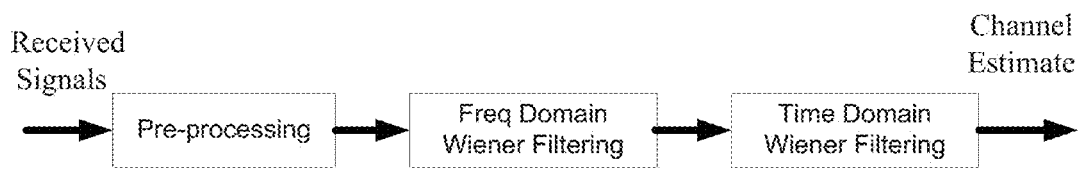
FIG. 6 provides an example illustration of a block diagram of processing steps for uplink channel estimation in accordance with an embodiment of the present invention.

For each PRB segment of the received signal, the uplink channel estimation involves three separate calculations, as shown in FIG. 6. First, the PRB segment of the received signal is pre-processed. In one embodiment, the received signal can be thought of as the channel coefficients multiplied by the reference signals. The received signal and the reference signals are known at the receiver. Theoretically, preprocessing can be used to estimate the channel coefficients by effectively dividing the received signal by the reference signals. In practice, additional details are also needed due to the division of the signal into PRB segments, the existence of sub-carriers and time symbols, and so forth. Pre-processing can be used to obtain a raw estimation of channel coefficients. Wiener filtering can then be used to reduce noise and interference in the channel estimation.

A fading channel can have fluctuations in both the frequency domain and the time domain. Thus, filtering can be provided in both domains, which are commonly referred to as dimensions. Since reference signals are not included in every symbol in the LTE standard, time domain filtering can be used for symbols that do not include a reference signal. Time domain filtering further reduces noise and can be used to obtain the channel estimation for the SC-FDMA symbols which have no reference signals. Time domain filtering can also be used to track the channel's fluctuation in the time dimension.

Frequency domain Wiener filtering can be used to mitigate noise and interference for an SC-FDMA symbol which includes one or more reference signals. The frequency domain filtering can also be used to track the channel's fluctuations in the frequency dimension.

Wiener filtering in the frequency domain can be performed on the pre-processed PRB segment to form a frequency filtered segment. Wiener filtering in the time domain can then be performed on the frequency filtered segment to determine a channel estimate for use in equalizing the received signal.

Variables used in the three calculations are defined as follows:
i: index of UE transmitting (TX) antenna
j: index of receiving (RX) antenna
$Y^{(j)}$: received signal at j-th receiving antenna in a PRB, a vector with 12 elements.
$H_k^{(i,j)}(l)$: frequency domain channel coefficients between TX antenna i and RX antenna j at subcarrier k and SC-FDMA symbol l.
$\underline{H}_k^{(i,j)}(l)$: channel coefficients between the i-th TX antenna and the j-th RX antenna in a PRB at SC-FDMA symbol l.
$\underline{H}^{(i,j)} := [H_0^{(i,j)}(l) \ H_1^{(i,j)}(l) \ldots H_{11}^{(i,j)}(l)]^T$, where T is a transpose of the matrix.
$\sigma_i^2$: Base station received power from UE i, determined by the long-term path loss from UE i to the base station.
$R_s^{(i)}$: $\text{diag}(rs_0^i \ rs_1^i \ldots rs_{11}^i)$, denoting the reference signal sequence defined in the LTE Standard and designated as R in example FIGS. 2 and 4.

$$R_{cs}^{(i)} := \text{diag}\left(e^{j\frac{2\pi n_{cs}^{(i)}}{12} \times 0}, e^{j\frac{2\pi n_{cs}^{(i)}}{12} \times 1}, \ldots, e^{j\frac{2\pi n_{cs}^{(i)}}{12} \times 11}\right),$$

denoting the cyclic shift sequence, as defined in the LTE Standard. The variable $n_{cs}$ is an integer between 0 and 11.
$R_{uv}$: the base sequence, as defined in the LTE Standard.
$N^{(j)}$: white noise with power $\sigma_n^2$
$(.)^H$: the conjugate transpose of the matrix (.)

Single Uplink Device

In a system comprising a single user device, referred to as User Equipment (UE) in the LTE standard, the index of the single UE is always 1. The receiver may have multiple receiving antennas, which are denoted j, as shown above. The channel estimate for a single UE is denoted $\underline{H}^{(1,j)}$. The signal to noise ratio (SNR) for the uplink channel from the UE can be denoted as $$SNR_1 = \frac{\sigma_1^2}{\sigma_n^2},$$

where $\sigma_n^2$ is the noise power. The pre-processing can be described by formula (1).

$$\tilde{Y}^{(j)} = (R_s^1)^H \cdot Y^{(j)} = (R_{uv})^H \cdot (R_{cs}^1)^H \cdot (R_{cs}^1 \cdot R_{uv} \cdot \sigma_1 \cdot \underline{H}^{(1,j)} + N^{(j)}) = \sigma_1 \cdot \underline{H}^{(1,j)} + \tilde{N}^{(j)}$$  (1)

The output $\tilde{Y}^{(j)}$ is a vector with 12 elements, with $\underline{H}^{(1,j)}$ the channel frequency response of the channel from the UE to the jth antenna at the receiver. The output $\tilde{Y}^{(j)}$ is referred to as the pre-processed segment of the received signal communicated over the channel from the UE to the j-th receiving antenna for a PRB. $\tilde{Y}^{(j)}$ is proportional to $Y^{(j)}$ divided by the reference signal $R_s^{(1)}$. Similarly, $\tilde{N}^{(j)}$ is proportional to the white noise power $N^{(j)}$ divided by the reference signal $R_s^{(1)}$.

The frequency domain Wiener filtering is described in formula (2).

$$\underline{\hat{H}}^{(1,j)} = R_{H\tilde{Y}} \cdot (R_{\tilde{Y}\tilde{Y}})^{-1} \cdot \tilde{Y}^{(j)}$$  (2)

In formula (2), $R_{\tilde{Y}\tilde{Y}}$ is the autocorrelation of the received signal and $$R_{H\tilde{Y}} = E\left\{\sigma_i \cdot \underline{H}^{(1,j)} \cdot (\tilde{Y}^{(j)})^H\right\} = \sigma_i^2 \cdot R_{pp} \text{(here } i=1)$$

is the cross-correlation between the desired channel and the received signals. The notation $E\{\ \}$ represents an expected value. $R_{pp}$ is the autocorrelation of the received signals corresponding to the reference signal. $R_{pp}$ can be derived from the subcarrier position and the channel's mean square root delay, $\tau_{rms}$. In one embodiment, a selected value of $\tau_{rms}$ that can provide good performance for multiple types of channel models is 1500 nanoseconds (ns). However, the actual value of $\tau_{rms}$ is dependent on the type of channel and system requirements. For instance, in one embodiment $\tau_{rms}$ may vary from 500 ns to 2000 ns.

The auto-correlation of the received signal is:

$$R_{\tilde{Y}\tilde{Y}} = E\left\{\tilde{Y}^{(j)} \cdot (\tilde{Y}^{(j)})^H\right\} = \sigma_1^2 \cdot R_{pp} + \sigma_n^2 \cdot I,$$

where I is a 12×12 unit matrix. The frequency domain Wiener filtering can be accomplished by multiplying the cross-correlation $R_{H\tilde{Y}}$ and the inverse of the auto-correlation $R_{\tilde{Y}\tilde{Y}}$ with the pre-processed segment $\tilde{Y}^{(j)}$ using equation (2). The resultant frequency domain Wiener filtering formula is:

$$\underline{\hat{H}}^{(1,j)} = R_{H\tilde{Y}} \cdot (R_{\tilde{Y}\tilde{Y}})^{-1} \cdot \tilde{Y}^{(j)} = R_{pp} \cdot \left(R_{pp} + \frac{1}{SNR_1} \cdot I\right)^{-1} \cdot \tilde{Y} = W \cdot \tilde{Y}.$$

Time domain filtering is described as:

$$\left[\hat{H}_k^{(i,j)}(0) \ \hat{H}_k^{(i,j)}(1) \ldots \hat{H}_k^{(i,j)}(13)\right]^T = \begin{bmatrix} W_0^{TD} \\ W_1^{TD} \\ \vdots \\ W_{13}^{TD} \end{bmatrix} \cdot \begin{bmatrix} \hat{H}_k^{(i,j)}(3) \\ \hat{H}_k^{(i,j)}(10) \end{bmatrix}$$  (4)

where W is the Wiener filter coefficient in the time domain. The matrix is comprised of 14 symbols in a subframe (i.e. two PRBs), where $\hat{H}_k^{(i,j)}(0)$ is the first output of the frequency domain filtered signal. In a received signal on an LTE physical uplink channel, symbols 3 and 10 are reference symbols. So the other symbols values are derived from the frequency domain Wiener filtering results of these two reference symbols. In formula (4), the time domain Wiener filtering coefficient for the l-th symbol is a real 1×2 vector described as:

$$W_l^{TD} = R_{hp}^{TD} \cdot \left( R_{pp}^{TD} + \frac{1}{SNR_i^{TD}} \cdot I \right)^{-1} = [W_l^{TD}(0) \ W_l^{TD}(1)] \quad (5)$$

where $R_{hp}^{TD}$ is the cross correlation matrix in the time domain and $R_{pp}^{TD}$ is the autocorrelation matrix in the time domain.

The time domain correlation matrices $R_{hp}^{TD}$ and $R_{pp}^{TD}$ depend on a maximum Doppler frequency, $f_d^{max}$. A value for $f_d^{max}$ may be selected to provide a desired performance of a UE at vehicle speeds. For instance, a value of 300 Hz can provide a desired performance for vehicle speeds of approximately 100 kilometers per hour (KPH). The actual maximum Doppler frequency may be less than or greater than 300 Hz, depending on the speed at which a UE is designed to be used.

Multiple Uplink Devices

In a system comprising multiple user devices that are in communication with multiple antennas at a receiver, to form a MIMO or virtual-MIMO system, the same pre-processing and time domain Wiener filtering can be used as described above for a single UE. As previously discussed, multiple devices may be used to form a virtual MIMO system in which at least two devices having one or more antennas can be used to communicate with a base station having two or more antennas to form the MIMO system. Alternatively, the virtual MIMO system may be comprised of two UE's that each have a single antenna communicating with two additional devices that each have a single antenna.

When multiple UEs are used, the frequency domain Wiener filtering is described as:

$$\hat{H}^{(1,j)} = \quad (6)$$
$$R_{pp} \cdot \left( R_{pp} + \frac{SNR_{3-i}}{SNR_i} \cdot \Delta R_{cs} \cdot R_{pp} \cdot (\Delta R_{cs})^H + \frac{1}{SNR_i} \cdot I \right)^{-1} \cdot Y = W \cdot Y,$$

where:

$$\Delta R_{CS} = \operatorname{diag}\left( e^{j \cdot \frac{2\pi}{12} \cdot (n_{cs}^{(3-i)} - n_{cs}^i) \cdot 0} e^{j \cdot \frac{2\pi}{12} \cdot (n_{cs}^{(3-i)} - n_{cs}^i) \cdot 1} \ldots e^{j \cdot \frac{2\pi}{12} \cdot (n_{cs}^{(3-i)} - n_{cs}^i) \cdot (N_P - 1)} \right).$$

where $N_P$ is the number of the subcarrier inside a PRB. For a virtual MIMO system with two UEs, with each UE having a single antenna, $\Delta R_{cs}$ becomes:

$$= \begin{cases} \operatorname{diag}\left( e^{j \cdot \frac{2\pi}{12} \cdot (n_{cs}^{(2)} - n_{cs}^1) \cdot 0} e^{j \cdot \frac{2\pi}{12} \cdot (n_{cs}^{(2)} - n_{cs}^1) \cdot 1} \ldots e^{j \cdot \frac{2\pi}{12} \cdot (n_{cs}^{(2)} - n_{cs}^1) \cdot (N_P - 1)} \right), i=1 \\ \operatorname{diag}\left( e^{j \cdot \frac{2\pi}{12} \cdot (n_{cs}^{(1)} - n_{cs}^2) \cdot 0} e^{j \cdot \frac{2\pi}{12} \cdot (n_{cs}^{(1)} - n_{cs}^{(2)}) \cdot 1} \ldots e^{j \cdot \frac{2\pi}{12} \cdot (n_{cs}^{(1)} - n_{cs}^2) \cdot (N_P - 1)} \right), i=2 \end{cases} \quad (7)$$

Using Wiener filtering in both the frequency domain and the time domain results in a channel estimation with a minimum mean square error (MMSE). Determining the channel estimation with MMSE can improve the performance (SNR) of a system by greater than 5 dB compared with a channel estimation that is calculated using least square error.

Figure 7:
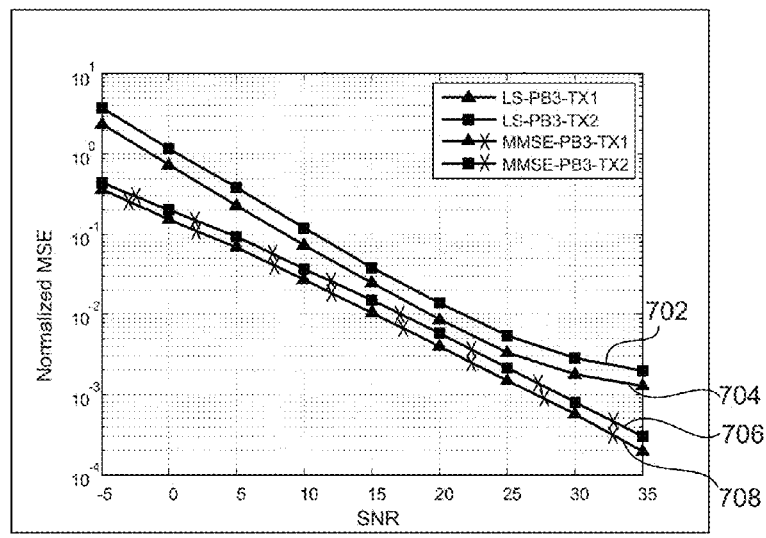
FIG. 7 provides an illustration displaying the results of a simulation to compare the difference between channel estimation using least squares estimation and MMSE channel estimation in accordance with an embodiment of the present invention.

FIG. 7 provides an illustration displaying the results of a simulation using a channel model, pb3, to compare the difference between channel estimation using least squares estimation and MMSE channel estimation using Wiener filtering, as previously described. The illustration shows a plot of the signal to noise ratio (SNR) using least squares for a first transmitter 702 and a second transmitter 704. Plots are also shown for SNR using Wiener filtering for the first transmitter 706 and the second transmitter 708. An improvement in SNR of approximately 5 db to 7 db is shown in the simulation.

The improvement in precision that is made possible through the use of MMSE channel estimation allows higher orders of modulation to be used, such as 64 quadrature amplitude modulation (QAM), as well as virtual MIMO, as previously discussed.

Moreover, the process of determining the channel estimation using MMSE can be divided into segments, such as PRB segments. The LTE standard allows bandwidth allocation to be increased by adding additional PRB segments. The increase of PRBs causes channel estimation complexity to increase linearly with respect to an increase in allocated bandwidth. In contrast, the complexity of channel estimation using least squares increases exponentially with increased bandwidth.

Figure 8:
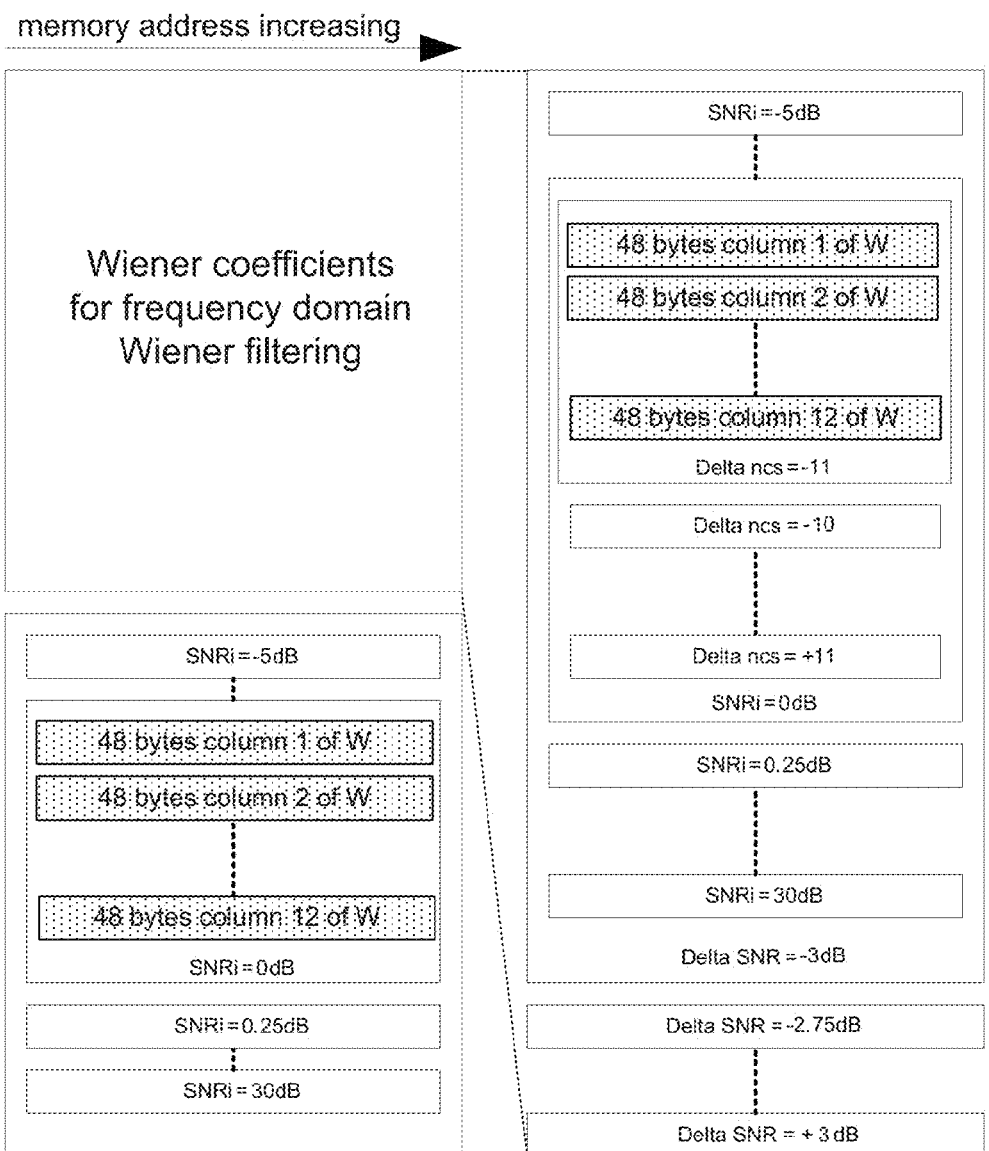
FIG. 8 illustrates a block diagram of an example for storing Wiener coefficients in a digital memory in accordance with an embodiment of the present invention.

The amount of processing needed to calculate the channel estimation using MMSE can be reduced by pre-calculating the Wiener filtering coefficients used in formulas (3) and (6). The pre-calculated filtering coefficients can be stored in a digital memory structure. For instance, FIG. 8 shows one example wherein the Wiener coefficient W is calculated and stored for each of the 12 sub-carriers in a PRB. In frequency domain Wiener filtering, 12 scalar inputs are used for each received signal on a subcarrier to estimate a channel having 12 subcarriers. The Wiener filtering coefficients can be organized into a 12×12 matrix. Each coefficient has a real part and an imaginary part. In one embodiment, each part can be represented by 16 bits (2 bytes) in a fixed point implementation. Thus, for a column with 12 wiener filtering coefficients, there are 12×2×2=48 bytes for each column in the 12×12 matrix. The coefficients are calculated in this example for an input signal to noise ratio (SNRi) of −5 dB to an SNRi of 30 dB in 0.25 dB increments. Coefficients can be calculated for each delta $n_{cs}$ value from −11 to +11 for each increment of dB, as shown in FIG. 8. The actual number of coefficients that are calculated and stored can be selected based on the available digital memory and system requirements. The pre-calculated coefficients avoid the computing-intensive matrix inversion that would otherwise be necessary.

Figure 9:
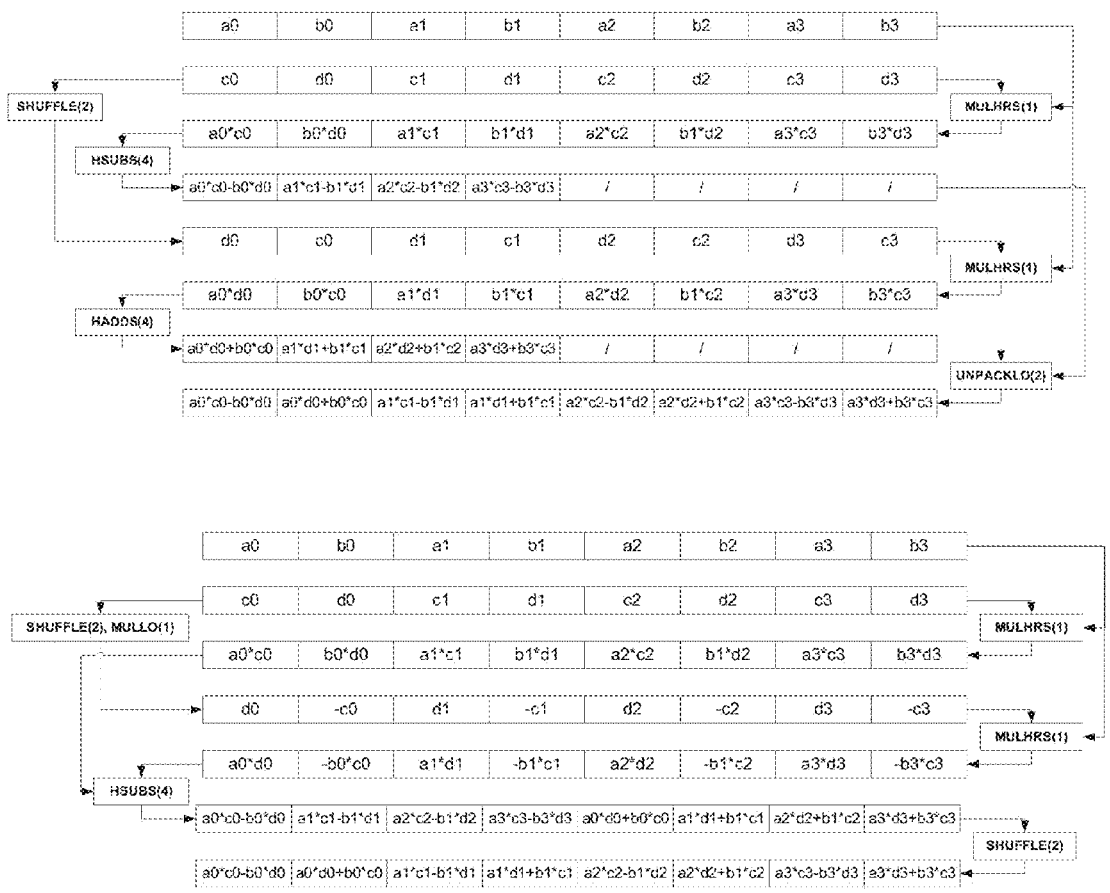
FIG. 9 illustrates one example of SIMD instructions that may be used to compute the Wiener filtering coefficients in accordance with an embodiment of the present invention.

In one embodiment, the Wiener filtering coefficients can be calculated using a computer processor with a streaming single instruction multiple data (SIMD) architecture, such as an Intel x86 architecture. FIG. 9 illustrates one example of SIMD instructions that may be used to compute the Wiener filtering coefficients. In this example embodiment, an instruction series is shown in FIG. 9 to compute the multiplication of the 12×12 Wiener filtering matrix and the 12 received signals to complete the Wiener filtering. It should be noted that FIG. 9 shows one step on the computation process that is repeated to complete the instruction series. Alternatively, other types of architectures can be used to process the channel estimation for each PRB segment, such as a reduced instruction set computing (RISC) architecture, a complex instruction set computing (CISC) architecture, and so forth.

Figure 10:
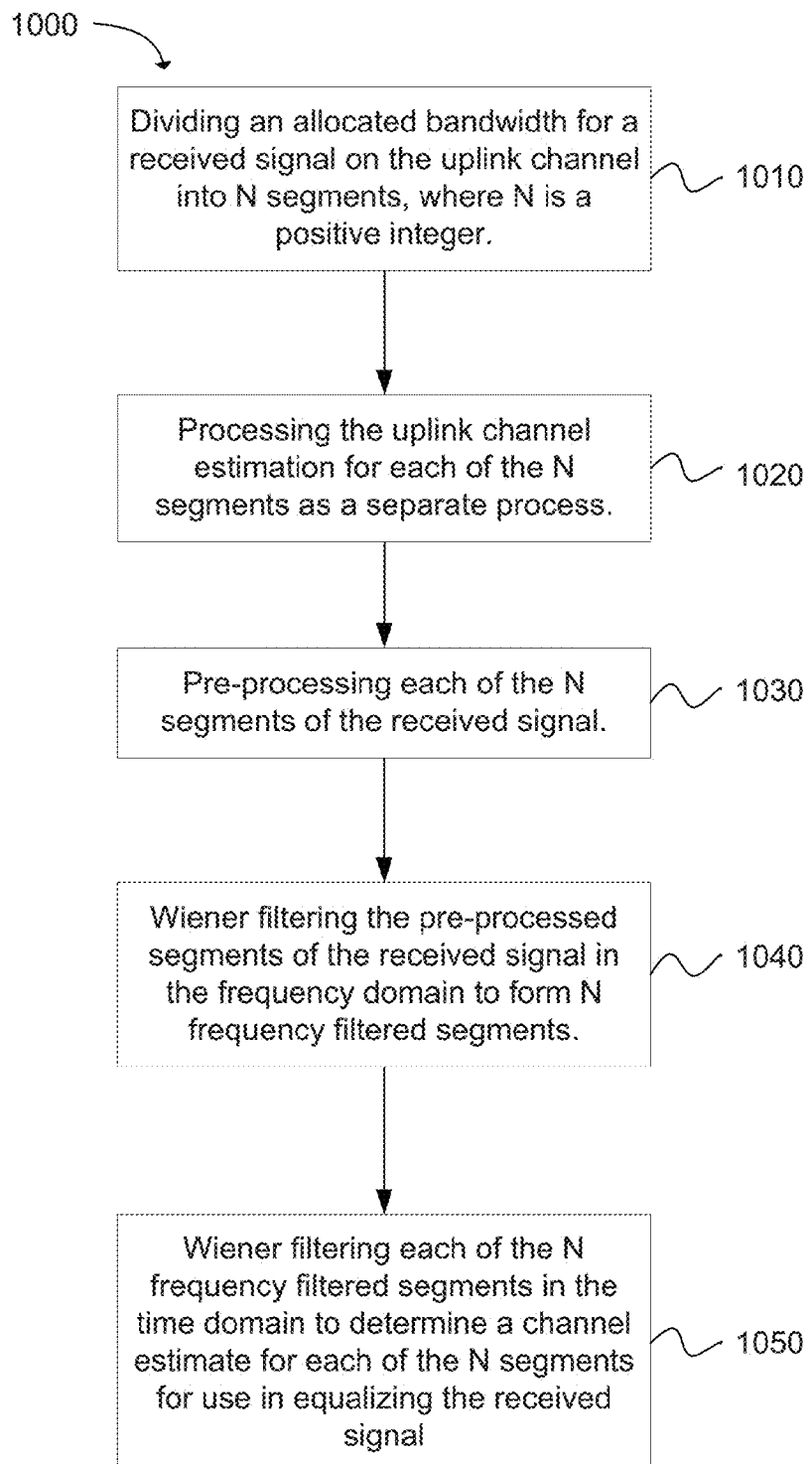
FIG. 10 depicts a flow chart of a method for uplink channel estimation for a software defined radio in accordance with an embodiment of the present invention.

In another embodiment, a method 1000 for uplink channel estimation for a software defined radio is disclosed, as depicted in the flow chart of FIG. 10. The method includes the operation of dividing 1010 an allocated bandwidth for a received signal on the uplink channel into N segments, where N is a positive integer. The uplink channel can be a physical uplink shared channel (PUSCH) or a physical uplink control channel (PUCCH) in the LTE standard. In one embodiment, the bandwidth of each segment is based on the bandwidth of the PRB in the LTE standard.

The method 1000 further comprises processing 1020 the uplink channel estimation for each of the N segments as a separate process. Each of the N segments can be processed as a separate process on a computer processor that is capable of parallel processing. For instance, each separate process may be processed as a separate thread as a computer processor configured to perform parallel processing. In addition, each process may be performed on a separate core in a multi-core processor. The multi-core processor may also be configured to perform multithreading. Each separate process may also be performed on a separate processor in a computer system that includes a plurality of processors. Performing the processing of the uplink channel estimation in parallel can enable the estimation to be performed in a sufficient time to enable a software defined radio to operate a radio operating on the LTE standard. The channel estimate may be determined for each of the N segments for each channel in a multiple input multiple output (MIMO) system.

Processing the uplink channel estimation comprises pre-processing 1030 each of the N segments of the received signal. The pre-processed segments of the received signal can then have Wiener filtering 1040 performed in the frequency domain to form N frequency filtered segments. Each of the N frequency filtered segments can then have Wiener filtering 1050 performed in the time domain to determine a channel estimate for each of the N segments for use in the received signal.

Figure 11:
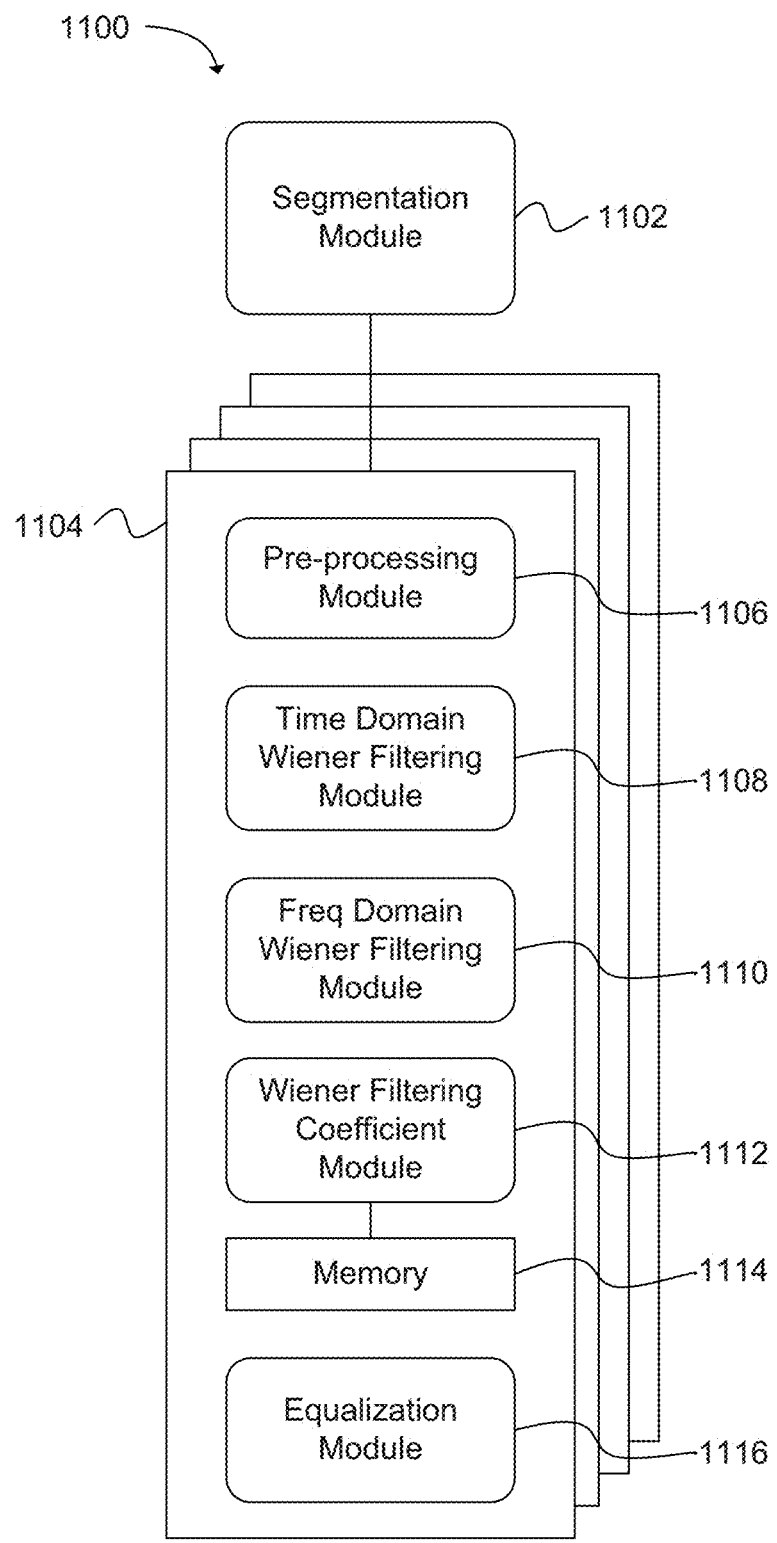
FIG. 11 illustrates a block diagram of a system for uplink channel estimation in accordance with an embodiment of the present invention.

In another embodiment, a system for uplink channel estimation for a software defined radio is disclosed. FIG. 11 provides one example block diagram of a system 1100. The system is comprised of a segmentation module 1102 configured to divide an allocated bandwidth for a received single carrier frequency division multiple access (SC-FDMA) signal into N segments, where N is a positive integer. N processing modules 1104 are configured to process the N segments respectively. The processing can occur in parallel, as previously discussed.

Each of the N processing modules 1104 can include a pre-processing module 1106, a time domain Wiener filtering module 1108, and a frequency domain Wiener filtering module 1110. The pre-processing module is configured to calculate an estimation of channel coefficients for one of the N segments. The time domain Wiener filtering module is configured to obtain the channel estimation for SC-FDMA symbols in the segment of the received signal that do not include a reference signal The frequency domain Wiener filtering module is configured to obtain the channel estimation for SC-FDMA symbols in the received signal that do include a reference signal.

In one embodiment, the processing module 1104 can include a Wiener filtering coefficient module 1112 coupled to a digital memory 1114. The coefficient module is configured to pre-calculate the Wiener filtering coefficients for Wiener filtering in the frequency domain and storing the Wiener filtering coefficients in the memory to increase the speed of processing the uplink channel estimation for the N segments. The processing module 1104 can also include an equalization module configured to equalize the received SC-FDMA signal using the channel estimation for each of the N segments in the received SC-FDMA signal.

It should be understood that some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for uplink channel estimation for a software defined radio, comprising:
dividing an allocated bandwidth for a received signal on the uplink channel at a base station into N segments, where N is a positive integer; and
processing the uplink channel estimation for each of the N segments as a separate process, comprising:
pre-processing one of the N segments of the received signal;
Wiener filtering the pre-processed segment of the received signal in the frequency domain to form a frequency filtered segment for multiple user equipment (UEs) using:

$$\hat{H}^{(1,j)} = R_{pp} \cdot \left( R_{pp} + \frac{SNR_{3-i}}{SNR_i} \cdot \Delta R_{cs} \cdot R_{pp} \cdot (\Delta R_{cs})^H + \frac{1}{SNR_i} \cdot I \right)^{-1} \cdot \tilde{Y} = W \cdot \tilde{Y},$$

where: i is an index of a UE transmitting (TX) antenna, j is an index of a receiving (RX) antenna, $R_{pp}$ is an autocorrelation of received signals corresponding to a reference signal, $$\Delta R_{CS} = \text{diag}\left( e^{j \cdot \frac{2\pi}{12} \cdot (n_{cs}^{(3-i)} - n_{cs}^i) \cdot 0} e^{j \cdot \frac{2\pi}{12} \cdot (n_{cs}^{(3-i)} - n_{cs}^i) \cdot 1} \ldots e^{j \cdot \frac{2\pi}{12} \cdot (n_{cs}^{(3-i)} - n_{cs}^i)(N_p - 1)} \right).$$

H is a conjugate transpose of a matrix, I is a unit matrix. $\tilde{Y}$ is a preprocessed segment of a received signal communicated over a channel from the UE, W is a Weiner filter coefficient in the time domain, ncs is an integer between 0 and 11, and NP is a number of a subcarrier inside a physical resource block (PRB); and
Wiener filtering the frequency filtered segment in the time domain to determine a channel estimate for the N segment for use in equalizing the received signal.

2. The method of claim 1, further comprising dividing the allocated bandwidth for the received signal on the uplink channel into the N segments wherein the uplink channel is one of a physical uplink shared channel and a physical uplink control channel.

3. The method of claim 1, wherein dividing the allocated bandwidth into N segments further comprises dividing the allocated bandwidth for the received signal on the uplink channel into N physical resource block (PRB) sized segments.

4. The method of claim 1, further comprising pre-calculating Wiener filtering coefficients for Wiener filtering in the frequency domain and storing the Wiener filtering coefficients in a memory to increase a speed of processing the uplink channel estimation.

5. The method of claim 1, further comprising processing the uplink channel estimation for each of the N segments as a separate process, wherein the separate process is processed on at least one of a distinct computer processor thread, a distinct computer processor core, and a distinct computer processor.

6. The method of claim 1, further comprising processing each separate process using a computer processor with a streaming single instruction multiple data (SIMD) architecture.

7. The method of claim 1, further comprising determining a channel estimate for each of the N segments for each channel in a virtual multiple input multiple output (MIMO) system.

8. The method of claim 7, further comprising pre-calculating Wiener filtering coefficients for Wiener filtering in the frequency domain for each of the channels in the MIMO system and storing the Wiener filtering coefficients in a digital memory to increase a speed of processing the uplink channel estimation for each of the channels.

9. The method of claim 1, further comprising performing the Wiener filtering in the time domain and the frequency domain to obtain a channel estimation with minimum mean square error (MMSE).

10. A system for uplink channel estimation, comprising:
a segmentation module configured to divide an allocated bandwidth for a received single carrier frequency division multiple access (SC-FDMA) signal at a base station into N segments, where N is a positive integer, wherein the segmentation module is located in a digital memory or is implemented in a hardware circuit; and
N processing modules configured to process the N segments respectively wherein the processing module is located in a digital memory or is implemented in a hardware circuit, with each processing module comprising:
a pre-processing module configured to calculate an estimation of channel coefficients for one of the N segments, wherein the pre-processing module is comprised of code that is stored in one or more digital memory devices to be executed by one or more processors or is implemented in a hardware circuit;
a time domain Wiener filtering module configured to obtain the channel estimation for SC-FDMA symbols in the segment of the received signal that do not include a reference signal, wherein the time domain Wiener filtering module is comprised of code that is stored in one or more digital memory devices to be executed by one or more processors or is implemented in a hardware circuit; and
a frequency domain Wiener filtering module configured to obtain the channel estimation for SC-FDMA symbols in the received signal that include a reference signal of multiple UEs, wherein the frequency domain Weiner filtering module is comprised of code that is stored in one or more digital memory devices to be executed by one or more processors or is implemented in a hardware circuit, wherein frequency domain Weiner filtering is performed using:

$$\hat{H}^{(1,j)} = R_{pp} \cdot \left( R_{pp} + \frac{SNR_{3-i}}{SNR_i} \cdot \Delta R_{cs} \cdot R_{pp} \cdot (\Delta R_{cs})^H + \frac{1}{SNR_i} \cdot I \right)^{-1} \cdot \tilde{Y} = W \cdot \tilde{Y},$$

where: i is an index of a UE transmitting (TX) antenna, j is an index of a receiving (RX) antenna, $R_{pp}$ is an autocorrelation of received signals corresponding to a reference signal, $$\Delta R_{CS} = \mathrm{diag}\left( e^{j \cdot \frac{2\pi}{12} \cdot (n_{cs}^{(3-i)} - n_{cs}^i) \cdot 0} e^{j \cdot \frac{2\pi}{12} \cdot (n_{cs}^{(3-i)} - n_{cs}^i) \cdot 1} \ldots e^{j \cdot \frac{2\pi}{12} \cdot (n_{cs}^{(3-i)} - n_{cs}^i) \cdot (N_p - 1)} \right).$$

H is a conjugate transpose of a matrix, I is a unit matrix, $\tilde{Y}$ is a preprocessed segment of a received signal communicated over a channel from the UE, W is a Weiner filter coefficient in the time domain, ncs is an integer between 0 and 11, and NP is a number of a subcarrier inside a physical resource block (PRB).

11. The system of claim 10, wherein the segmentation module is configured to divide the allocated bandwidth for the received SC-FDMA signal into N physical resource block (PRB) sized segments.

12. The system of claim 10, wherein the segmentation module is configured to divide an allocated bandwidth for a received SC-FDMA signal operating on one of a physical uplink shared channel and a physical uplink control channel.

13. The system of claim 10, wherein each processing module further comprises a Wiener filtering coefficient module configured to pre-calculate the Wiener filtering coefficients for Wiener filtering in the frequency domain and storing the Wiener filtering coefficients in a digital memory to increase a speed of processing the uplink channel estimation for the N segments, wherein the Weiner filtering coefficient module is comprised of code that is stored in one or more digital memory devices to be executed by one or more processors or is implemented in a hardware circuit.

14. The system of claim 10, wherein each pre-processing module operates in parallel on at least one of a distinct computer processor thread, a distinct computer processor core, and a distinct computer processor.

15. The system of claim 10, wherein pre-processing module operates on a computer processor with a streaming single instruction multiple data (SIMD) architecture.

16. The system of claim 10, wherein the N processing modules are configured to process the N segments for each channel in a multiple input multiple output (MIMO) system.

17. The system of claim 10, further comprising an equalization module configured to equalize the received SC-FDMA signal using the channel estimation for each of the N segments in the received SC-FDMA signal, wherein the equalization module is comprised of code that is stored in one or more digital memory devices to be executed by one or more processors or is implemented in a hardware circuit.

18. The system of claim 10, wherein the uplink channel estimation is performed for a software defined radio.

19. At least one non-transitory computer usable medium storing computer readable program code for uplink channel estimation for a software defined radio, which when executed by a processor perform the following:
dividing an allocated bandwidth for a received single carrier frequency division multiple access (SC-FDMA) signal on an uplink channel at a base station into N physical resource block (PRB) sized segments, where N is a positive integer; and
processing an uplink channel estimation for each of the N PRB sized segments as a separate process in parallel, comprising:
pre-processing one of the N PRB segments of the received signal;
Wiener filtering the pre-processed segment of the received signal in the frequency domain to form a frequency filtered segment for multiple UEs using:

$$\hat{H}^{(1,j)} = R_{pp} \cdot \left( R_{pp} + \frac{SNR_{3-i}}{SNR_i} \cdot \Delta R_{cs} \cdot R_{pp} \cdot (\Delta R_{cs})^H + \frac{1}{SNR_i} \cdot I \right)^{-1} \cdot \tilde{Y} = W \cdot \tilde{Y},$$

where: i is an index of a UE transmitting (TX) antenna, j is an index of a receiving (RX) antenna, $R_{pp}$ is an autocorrelation of received signals corresponding to a reference signal, $$\Delta R_{CS} = \mathrm{diag}\left( e^{j \cdot \frac{2\pi}{12} \cdot (n_{cs}^{(3-i)} - n_{cs}^i) \cdot 0} e^{j \cdot \frac{2\pi}{12} \cdot (n_{cs}^{(3-i)} - n_{cs}^i) \cdot 1} \ldots e^{j \cdot \frac{2\pi}{12} \cdot (n_{cs}^{(3-i)} - n_{cs}^i) \cdot (N_p - 1)} \right).$$

H is a conjugate transpose of a matrix, I is a unit matrix, $\tilde{Y}$ is a preprocessed segment of a received signal communicated over a channel from the UE, W is a Weiner filter coefficient in the time domain, ncs is an integer between 0 and 11, and NP is a number of a subcarrier inside a physical resource block (PRB);
Wiener filtering the frequency filtered segment in the time domain to determine a channel estimate for the segment for use in equalizing the received signal; and
equalizing the received signal using the channel estimate for each of the N segments.

20. The at least one non-transitory computer usable medium of claim 19, further comprising determining a channel estimate for each of the N segments for each channel in a virtual multiple input multiple output (MIMO) system.

21. The at least one non-transitory computer usable medium of claim 20, further comprising pre-calculating Wiener filtering coefficients for Wiener filtering in the frequency domain for each of the channels in the MIMO system and storing the Wiener filtering coefficients in a memory to increase a speed of processing the uplink channel estimation for each of the channels.

* * * * *